United States Patent
Richardson et al.

(10) Patent No.: US 11,541,719 B1
(45) Date of Patent: Jan. 3, 2023

(54) ACTIVE THERMAL MANAGEMENT SYSTEMS AND CONTROL LOGIC FOR HEAT EXCHANGER STORAGE OF REFRIGERANT

(71) Applicant: GM GLOBAL TECHNOLOGY OPERATIONS LLC, Detroit, MI (US)

(72) Inventors: Devin C. Richardson, Novi, MI (US); Nathan J. English, Auburn Hills, MI (US); Anthony J. Donatelli, Waterford, MI (US); Cameron P. Smith, Milford, MI (US); Tanay K. Patel, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/305,753

(22) Filed: Jul. 14, 2021

(51) Int. Cl.
    *F25D 23/12*   (2006.01)
    *B60H 1/00*    (2006.01)
    *B60H 1/32*    (2006.01)
    *B60H 1/03*    (2006.01)

(52) U.S. Cl.
    CPC ......... *B60H 1/00278* (2013.01); *B60H 1/004* (2013.01); *B60H 1/00485* (2013.01); *B60H 1/034* (2013.01); *B60H 1/3213* (2013.01); *B60H 1/3227* (2013.01); *B60H 1/32284* (2019.05); *B60H 2001/00307* (2013.01)

(58) Field of Classification Search
    CPC ............ B60H 1/00278; B60H 1/32284; B60H 1/004; B60H 1/00485; B60H 1/034; B60H 1/3213; B60H 1/3227; B60H 2001/00307
    USPC ........................................................ 62/259.2
    See application file for complete search history.

(56) References Cited

U.S. PATENT DOCUMENTS

| | | |
|---|---|---|
| 5,105,784 A  | 4/1992  | Davis et al. |
| 6,450,275 B1 | 9/2002  | Gabriel et al. |
| 6,602,624 B1 | 8/2003  | Doan et al. |
| 7,264,895 B2 | 9/2007  | White |
| 7,759,010 B2 | 7/2010  | Hoch |
| 8,313,871 B2 | 11/2012 | Wexel et al. |

(Continued)

FOREIGN PATENT DOCUMENTS

| CN | 108749513 A | * 11/2018 |
|---|---|---|
| CN | 110217071 A | * 9/2019 |
| CN | 111727128 A | * 9/2020 |

*Primary Examiner* — Davis D Hwu
(74) *Attorney, Agent, or Firm* — Quinn IP Law (57) ABSTRACT

Presented are joint active thermal management (JATM) systems with heat exchanger storage of surplus refrigerant, methods for making/operating such systems, and vehicles equipped with such systems. A JATM system includes a coolant loop that fluidly connects to a vehicle battery system for pumping thereto coolant, an oil loop thermally coupled to the coolant loop and fluidly connected to a vehicle powertrain system for pumping thereto oil, and a refrigerant loop thermally coupled to the coolant loop and operable to circulate refrigerant for heating/cooling a passenger compartment. An electronic controller determines if a current amount of refrigerant in the refrigerant loop exceeds a calibrated threshold for the current operating mode of the JATM system. If so, the controller determines if one of the refrigerant loop's heat exchangers is available to store excess refrigerant. If the heat exchanger is available, the refrigerant loop stores excess refrigerant in the available refrigerant heat exchanger.

14 Claims, 3 Drawing Sheets

(56) References Cited

U.S. PATENT DOCUMENTS

| | | |
|---|---|---|
| 8,371,512 B2 | 2/2013 | Douarre |
| 8,402,776 B2 | 3/2013 | Johnston et al. |
| 8,413,434 B2 | 4/2013 | Prior et al. |
| 8,603,654 B2 | 12/2013 | Cartwright et al. |
| 10,118,460 B1 | 11/2018 | Blatchley et al. |
| 10,252,597 B2 | 4/2019 | Wallace et al. |
| 10,392,018 B1 | 8/2019 | Rhodes et al. |
| 10,930,952 B2 | 2/2021 | Watanabe et al. |
| 2008/0087039 A1 | 4/2008 | Reed et al. |
| 2008/0127666 A1 | 6/2008 | Major et al. |
| 2009/0020620 A1 | 1/2009 | Douarre |
| 2010/0064700 A1 | 3/2010 | Ziehr et al. |
| 2012/0136535 A1 | 5/2012 | Buford et al. |
| 2012/0216562 A1 | 8/2012 | Kadle et al. |
| 2012/0316712 A1 | 12/2012 | Simonini et al. |
| 2014/0332179 A1 | 11/2014 | Vandike et al. |
| 2015/0101549 A1 | 4/2015 | Bilancia |
| 2015/0129161 A1 | 5/2015 | Nishikawa et al. |
| 2015/0202986 A1 | 7/2015 | Hatakeyama et al. |
| 2015/0217623 A1 | 8/2015 | Hatakeyama et al. |
| 2015/0258875 A1 | 9/2015 | Enomoto et al. |
| 2015/0291002 A1 | 10/2015 | Smith |
| 2016/0129756 A1 | 5/2016 | Enomoto et al. |
| 2016/0248129 A1 | 8/2016 | Dunham et al. |
| 2016/0339767 A1 | 11/2016 | Enomoto et al. |
| 2017/0087957 A1 | 3/2017 | Blatchley et al. |
| 2017/0110775 A1 | 4/2017 | Smith |
| 2017/0295058 A1 | 10/2017 | Gottschalk et al. |
| 2018/0162377 A1 | 6/2018 | Colavincenzo |
| 2018/0209393 A1 | 7/2018 | Revach |
| 2018/0236842 A1 | 8/2018 | Allgaeuer et al. |
| 2018/0264913 A1 | 9/2018 | Enomoto et al. |
| 2018/0319246 A1 | 11/2018 | Allgaeuer et al. |
| 2018/0361828 A1 | 12/2018 | Kato et al. |
| 2019/0039434 A1 | 2/2019 | Wallace et al. |
| 2019/0039439 A1 | 2/2019 | Aldridge |
| 2019/0070924 A1 | 3/2019 | Mancini et al. |
| 2019/0225047 A1 | 7/2019 | Porras et al. |
| 2019/0226723 A1 | 7/2019 | Heyl et al. |
| 2019/0263223 A1 | 8/2019 | Durrani et al. |
| 2019/0299791 A1 | 10/2019 | Gonze et al. |
| 2019/0308489 A1 | 10/2019 | Spies et al. |
| 2019/0366800 A1 | 12/2019 | Durrani et al. |
| 2020/0009968 A1 | 1/2020 | Lewis et al. |
| 2020/0047586 A1 | 2/2020 | Gonze et al. |
| 2020/0317026 A1 | 10/2020 | Kitamura et al. |
| 2020/0324611 A1 | 10/2020 | Yano et al. |
| 2020/0343601 A1 | 10/2020 | Carlson et al. |
| 2020/0353790 A1 | 11/2020 | Miyoshi |

* cited by examiner

ACTIVE THERMAL MANAGEMENT SYSTEMS AND CONTROL LOGIC FOR HEAT EXCHANGER STORAGE OF REFRIGERANT

INTRODUCTION

The present disclosure relates generally to thermal management systems. More specifically, aspects of this disclosure relate to active thermal management systems for the power electronics, prime movers, and electric storage devices of electric-drive vehicles.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric vehicles (HEVs) and full electric vehicles (FEVs), on the other hand, utilize alternative power sources to propel the vehicle and, thus, minimize or eliminate reliance on a fossil-fuel based engine for tractive power.

During normal operation of hybrid and electric vehicles (collectively "electric-drive vehicles"), the internal combustion engine (ICE) assemblies and large traction motors generate a significant amount of heat that may be radiated into the vehicle's interior compartments. To prolong the operational life of the prime mover and the associated components packaged within the vehicle, most automobiles are equipped with passive and active features for managing powertrain temperature. Passive measures for governing excessive heating within the engine compartment include, for example, thermal wrapping of the exhaust runners, thermal coating of the headers and manifolds, and integrating thermally insulating packaging for heat sensitive electronics. Active means for cooling the engine compartment include high-performance radiators, high-output coolant pumps, and electric cooling fans. As another option, some vehicle hood assemblies are provided with active or passive air vents that expel hot air and amplify convective cooling within the engine bay.

Active thermal management (ATM) systems for automotive powertrains normally employ a central vehicle controller or dedicated control module to regulate operation of a cooling circuit that distributes fluid coolant, generally of oil, water, and/or antifreeze, through heat-producing powertrain components. For standard ICE applications, a coolant pump propels the cooling fluid—colloquially known as "engine coolant"—through coolant passages in the engine block, coolant channels in the transmission case and sump, and hoses to an air-cooled radiator. For early generation hybrid and electric vehicles, the in-vehicle active thermal management system used multiple independent thermal subsystems for cooling discrete segments of the powertrain. Some hybrid electric vehicle (HEV) ATM architectures required a dedicated coolant loop for the engine and transmission, a separate, independently controlled coolant loop for the electric motor(s) and power electronics modules, and yet another distinct coolant loop for regulating battery pack operating temperature. Such an approach is inherently inefficient as multiple independently operated thermal management subsystems require the vehicle be equipped with redundant sets of system components (e.g., a dedicated heat exchanger, a dedicated pump, dedicated valves, etc., for each loop).

SUMMARY

Presented herein are active thermal management systems and control logic for heat exchanger storage of surplus refrigerant, methods for making and methods for operating such systems, and motor vehicles equipped with such systems. In a non-limiting example, a joint active thermal management (JATM) system employs mutually parallel thermal loops to regulate the operating temperatures of the in-vehicle traction battery pack and supporting electronics (first "coolant" loop), the transmission, engine and/or motor (second "oil" loop), and the passenger compartment (third "refrigerant" loop). On an electric-drive vehicle, the volume of active refrigerant in the JATM system is increased to account for propulsion cooling loads that compound passenger compartment cooling demands. However, the same refrigerant system may also be used in a heat-pump capacity for heating the passenger compartment; in this mode of operation, the requisite quantity of active refrigerant in the system plumbing is markedly less. Using an incremental fill technique, the JATM system stores excess refrigerant in a heat exchanger device that is not active during heating modes of operation. For instance, a front-end condenser in parallel fluid-flow communication with the vehicle's heating, ventilation and air conditioning (HVAC) system, is selectively employed as a refrigerant storage sump for dynamically stowing surplus refrigerant.

Attendant benefits for at least some of the disclosed concepts include thermal systems, methods, and devices that enable the temporary stowage of excess refrigerant within an unused heat exchange device. This enables the active thermal management system to undertake extreme fluctuations in thermal loads through the use of electronic valves to control multiple parallel thermal flow paths. Disclosed methods and algorithms provision the storing of refrigerant within the system's heat exchangers, rather than routing the excess refrigerant back to a dedicated refrigerant drive (RD) bottle, to more quickly and efficiently meet cabin comfort demands while protecting vehicle hardware that is susceptible to damage when running with improper refrigerant levels. Disclosed techniques may help to enable a thermal management system to operate in a wide range of ambient temperatures and driving modes, while also offering hardware cost savings, and improving the overall robustness of the thermal system.

Aspects of this disclosure are directed to active thermal management systems and control logic for heat exchanger storage of surplus refrigerant. By way of example, a representative JATM system includes three thermally interconnected, fluidly isolated branches: a first (coolant) thermal loop, a second (oil) thermal loop, and a third (refrigerant) thermal loop. The first thermal loop includes one or more (first) fluid conduits that fluidly connect to a vehicle battery system, a coolant loop (first) heat exchanger that is fluidly connected to at least one of these conduits, and a coolant (first) pump operable to pump coolant through the vehicle battery system and the coolant heat exchanger. The second thermal loop includes one or more (second) fluid conduits that fluidly connect to a vehicle powertrain system, an oil loop (second) heat exchanger that is fluidly connected to at least one of these conduits, and an oil (second) pump operable to pump oil through the powertrain system and the oil heat exchanger. The third thermal loop includes one or more parallel (third and fourth) fluid conduits that circulate refrigerant for heating/cooling a vehicle passenger compartment. One or more refrigerant loop (third) heat exchangers is/are located in one of the parallel fluid conduits, and one or more coolant loop (fourth) heat exchangers is/are located in another one of the parallel fluid conduits.

Continuing with the discussion of the above example, the JATM system also includes a resident or remote electronic controller that is programmed to determine if a current amount of refrigerant in the third thermal loop exceeds a calibrated threshold amount of refrigerant allowed for a current operating mode of the JATM system. If so, the controller responsively determines if one of the refrigerant loop heat exchangers is currently not in use and is available to store excess refrigerant (e.g., a mathematical difference between the current amount of refrigerant in the system and the calibrated threshold amount allowed for the current operating mode). If a refrigerant heat exchanger is available, one or more command signals are transmitted to the third thermal loop to store some or all of the excess refrigerant in the available heat exchanger.

Additional aspects of this disclosure are directed to motor vehicles equipped with active thermal management systems that provision heat exchanger storage of surplus refrigerant. As used herein, the terms "vehicle" and "motor vehicle" may be used interchangeably and synonymously to include any relevant vehicle platform, such as passenger vehicles (ICE, HEV, FEV, FCH, fully and partially autonomous, etc.), commercial vehicles, industrial vehicles, tracked vehicles, off-road and all-terrain vehicles (ATV), motorcycles, farm equipment, watercraft, aircraft, etc. Disclosed JATM features are applicable to automotive and non-automotive applications alike. In an example, a motor vehicle includes a vehicle body with a passenger compartment, multiple road wheels rotatably mounted to the vehicle body (e.g., via wheel corner modules coupled to a unibody chassis or body-on-frame chassis), and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to thereby propel the vehicle. An in-vehicle battery system utilizes one or more traction battery packs for powering the traction motor(s).

Continuing with the discussion of the above example, the vehicle also includes a JATM system with a coolant loop that fluidly connects to the vehicle battery system and pumps coolant through the vehicle battery system and a coolant loop heater and/or radiator. An oil loop, which is thermally coupled to the coolant loop, is fluidly connected to the vehicle powertrain system and pumps oil through the powertrain system and a transmission oil cooler. A refrigerant loop, which is also thermally coupled to the coolant loop, circulates refrigerant through parallel coolant conduits, a refrigerant heating condenser, an evaporator, a refrigerant chiller, and a front-end refrigerant condenser to thereby cool and heat the passenger compartment. A resident or remote controller or network of controllers, upon determining that there is excess refrigerant in the refrigerant loop for a current operating mode of the JATM system, commands the refrigerant loop to store at least a portion of the excess refrigerant in an available heat exchanger (e.g., the front-end refrigerant condenser if the condenser is not currently in use and has available storage capacity).

Other aspects of this disclosure are directed to manufacturing processes, control logic, and computer-readable media (CRM) for making or using any of the disclosed JATM systems and/or motor vehicles. In an example, a method is presented for operating a joint active thermal management system for a motor vehicle. This representative method includes, in any order and in any combination with any of the above and below disclosed options and features: circulating a refrigerant through parallel conduits of a refrigerant loop to thereby heat and/or cool a passenger compartment of the motor vehicle, the refrigerant loop including a first refrigerant heat exchanger fluidly connected to a first of the parallel conduits, and a second refrigerant heat exchanger fluidly connected to a second of the parallel conduits; determining, via an electronic controller communicating with the refrigerant loop and a sensor device, if a current amount of the refrigerant in the refrigerant loop exceeds a calibrated threshold amount for a current operating mode of the JATM system; determining, via the electronic controller responsive to the current amount exceeding the calibrated threshold, if the second refrigerant heat exchanger is available to store a refrigerant differential between the current amount and the calibrated threshold amount; and transmitting, responsive to the second refrigerant heat exchanger being available, a command signal to the refrigerant loop to store at least a portion of the refrigerant differential in the second refrigerant heat exchanger.

For any of the disclosed thermal systems, vehicles, and methods, determining if the current amount of refrigerant exceeds the calibrated threshold amount may include determining the current operating mode of the JATM system and retrieving, from a lookup table stored in a resident or remote memory device, the calibrated threshold amount associated with the current operating mode of the JATM system. In this instance, determining if the current amount of refrigerant exceeds the calibrated threshold may also include receiving, from a sensor device, sensor signals indicative of a volume, a mass, and/or a pressure of the refrigerant in the third fluid loop. Retrieving the calibrated threshold amount from the lookup table may optionally include retrieving a calibrated "severe" threshold amount and a calibrated "mild" threshold amount, which is less than the calibrated severe threshold. In this instance, determining if the current amount of refrigerant exceeds the calibrated threshold may include determining if the current amount of refrigerant exceeds the calibrated mild threshold amount and, if so, then determining if the current amount of refrigerant exceeds the calibrated severe threshold.

For any of the disclosed thermal systems, vehicles, and methods, determining if one of the refrigerant heat exchangers is available to store excess refrigerant may include: evaluating a first set of criteria responsive to the current amount of refrigerant in the third thermal loop exceeding the calibrated mild threshold amount; and/or evaluating a second set of criteria, which is distinct from the first set of criteria, responsive to the current amount exceeding the calibrated severe threshold amount. In this instance, the first set of criteria may include: confirming an air conditioning compressor in the third thermal loop is operational and not ramping down; confirming an active flow-control valve fluidly upstream from the available refrigerant heat exchanger is closed; and confirming a pressure of the refrigerant in the third thermal loop is equal to or greater than a threshold minimum pressure. By comparison, the second set of criteria may include or, optionally, may consist essentially of confirming that the active flow-control valve fluidly upstream from the available refrigerant heat exchanger is closed.

For any of the disclosed thermal systems, vehicles, and methods, the command signal(s) may be sent to an electronic flow-control valve located fluidly upstream from the available refrigerant heat exchanger; the signal(s) may cause the electronic flow-control valve to position in a partially open state (e.g., less than about 1.0% open). In this instance, the command signal(s) may cause the electronic flow-control valve to fluctuate between the partially open state and a fully closed state, e.g., to ensure that a passive pressure-control valve fluidly downstream from the available heat exchanger does reach its pressure threshold and inadvertently opens. Alternatively, the command signal(s) may cause the electronic flow-control valve to open in predefined increments (e.g., 0.15% open, 0.25% open, 0.35% open . . . 0.75% open) from a closed state to the partially open state.

For any of the disclosed thermal systems, vehicles, and methods, the electronic controller may automatically respond to the refrigerant loop heat exchanger not being available by transmitting one or more command signals to the third thermal loop to store some or all of the excess refrigerant in a dedicated refrigerant storage container. In at least some embodiments, the oil loop (second) heat exchanger includes a transmission oil cooler, which may be fluidly connected to a coolant loop conduit and an oil loop conduit to thereby thermally couple the second thermal loop to the first thermal loop. As yet a further option, the third thermal loop may include a refrigerant chiller that is fluidly connected to a coolant loop conduit and a refrigerant loop conduit to thereby thermally couple the third thermal loop to the first thermal loop. While the three coolant loops may be thermally coupled to one another in a manner designed to exchange thermal energy between loops, they may be said to lack a direct fluid coupling whereby the coolant mixes with the oil, the oil mixes with the refrigerant, or the refrigerant mixes with the coolant.

Each coolant loop may include a variety of discrete and shared heat exchangers. The coolant loop, for example, may employ a coolant heater, a radiator, and/or a chiller shared with the refrigerant loop. As yet another example, the oil loop may also include one or more heat exchangers, including a transmission oil cooler that is shared with the refrigerant loop. Likewise, the refrigerant loop may include an assortment of heat exchangers, such as a refrigerant heating condenser, an evaporator, a refrigerant chiller, an electric compressor, and/or a front-end refrigerant condenser.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features described above and below.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Figure 1:
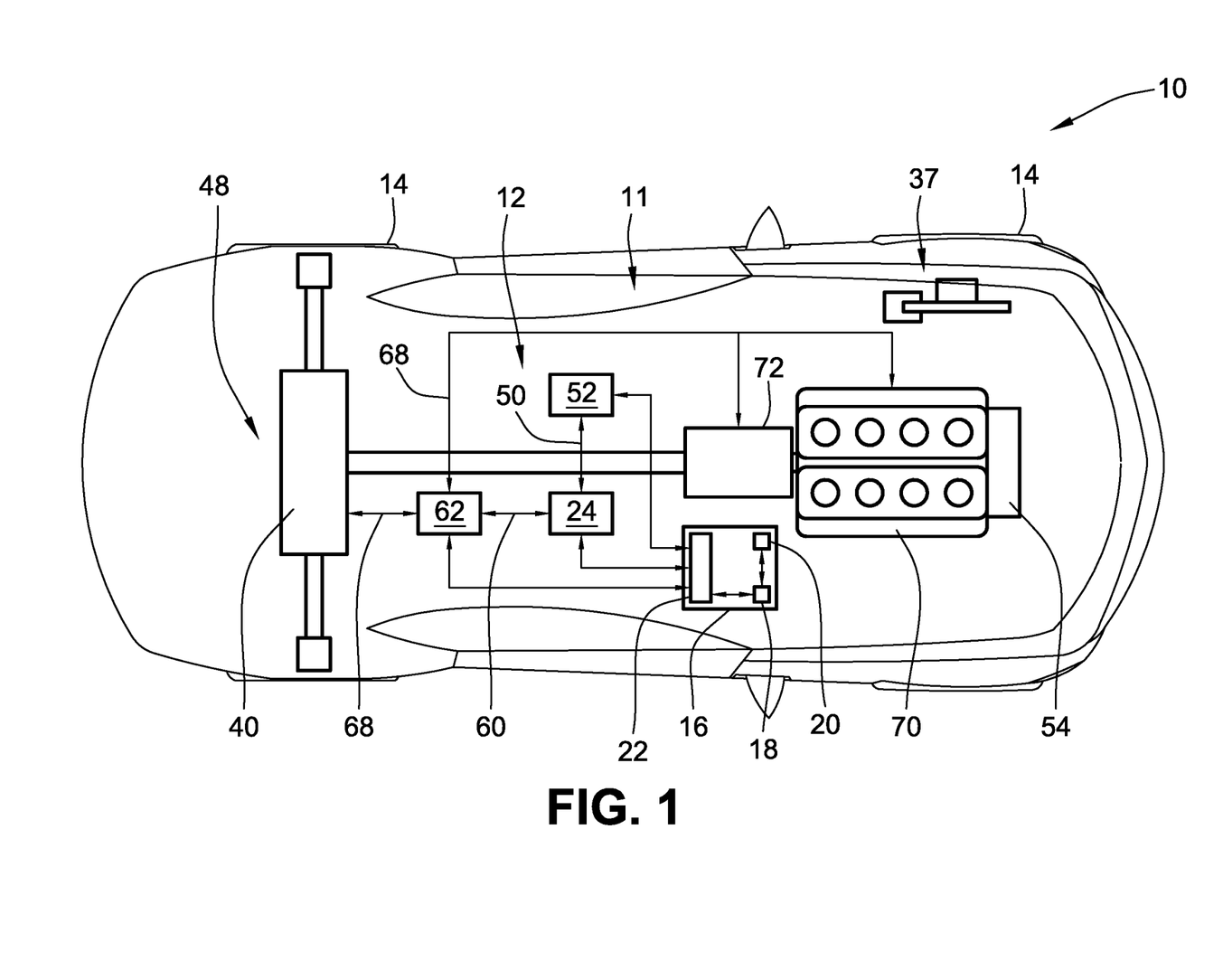
FIG. 1 is a schematic, plan-view illustration of a representative electric-drive vehicle equipped with a joint active thermal management (JATM) system in accordance with aspects of the present disclosure.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a P4 "mild" hybrid-electric powertrain. The illustrated automobile 10—also referred to herein as "motor vehicle" or "vehicle" for short—is merely an exemplary application with which novel aspects of this disclosure may be practiced. In the same vein, implementation of the present concepts into a hybrid electric powertrain should also be appreciated as a representative implementation of the novel concepts disclosed herein. As such, it will be understood that facets of the present disclosure may be applied to other powertrain architectures, incorporated into any logically relevant type of motor vehicle, and utilized for both automotive and non-automotive applications alike. Lastly, only select components have been shown in the drawings and will be described in additional detail herein. Nevertheless, the thermal management systems and motor vehicles discussed below may include numerous additional and alternative features, and other available peripheral components, for carrying out the various methods and functions of this disclosure.

Motor vehicle 10 of FIG. 1 is equipped with a joint active thermal management (JATM) system 12 for governing operational heat levels in the vehicle powertrain and battery systems while concomitantly regulating cabin temperatures within the passenger compartment. The JATM system 12 architecture may be typified by multiple dissimilar yet thermally interconnected thermal fluid loops, each of which is responsible for controlling a temperature level within a respective sub-system of the vehicle 10. These distinct thermal fluid loops—represented in FIGS. 1 and 2 by a coolant loop (first loop) 24, an oil loop (second loop) 62, and a refrigerant loop (third loop) 52—transfer thermal energy between heat sources and heat sinks associated with one or more vehicle sub-systems. Some of the heat sources are notably larger than others such that heat generated within one subsystem may be markedly higher than heat generated in other subsystems. Likewise, some of the heat sinks are significantly larger and, thus, capable of storing more thermal energy than other heat sinks. Accordingly, thermal energy may be selectively transferred from one thermal fluid loop to another during predefined system operating conditions. In the illustrated example, all active circulation of thermal energy generated onboard the vehicle 10 may be performed solely via the thermally connected fluid loops. Put another way, any needs for heating and cooling of vehicle components, as well as heating and cooling of the passenger compartment, may be met using only the three illustrated loops.

Figure 2:
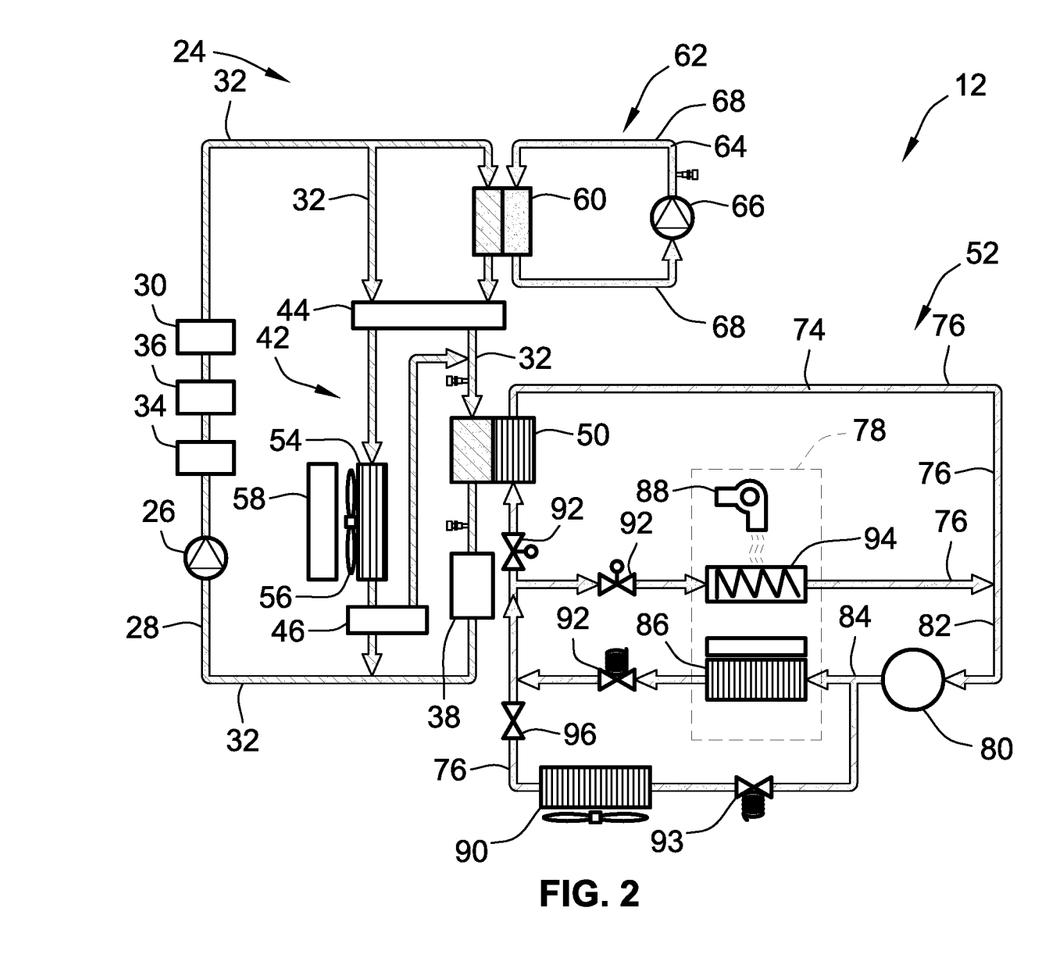
FIG. 2 is a schematic diagram of the representative JATM system of FIG. 1 showing selective storage of surplus refrigerant within an inactive front-end condenser during a heating mode of operation in accordance with aspects of the present disclosure.

An electronic controller 16 is constructed and programmed to manage operation of the JATM system 12, including the individual and collective control of the three thermal fluid loops 24, 52, 62. Control module, module, controller, control unit, electronic control unit, processor, microprocessor, and any permutations thereof, may be used interchangeably and synonymously to mean any one or various combinations of one or more of logic circuits, combinational logic circuit(s), Application Specific Integrated Circuit(s) (ASIC), electronic circuit(s), central processing unit(s) (e.g., microprocessor(s), semiconductor IC devices), input/output circuit(s) and devices, appropriate signal conditioning and buffer circuitry, and other components, such as a high-speed clock and wireless communications device 20, to provide any herein described functionality, etc. Associated storage and memory 18 (e.g., read only, programmable read only, random access, hard drive, tangible, etc.), whether resident, remote, or a combination of both, store processor-executable software and/or firmware programs or routines. A communications bus 22 allows the internal devices of the controller 16 to communicate with one another and with other on-board sensors, actuators, and devices resident to the vehicle 10 as well as off-board devices external to the vehicle 10.

Software, firmware, programs, instructions, routines, code, algorithms, and similar terms may be used interchangeably and synonymously to mean any processor-executable instruction sets, including calibrations and look-up tables. The vehicle controller 16 may be designed with a set of control routines executed to provide desired functions. Control routines are executed, such as by a central processing unit, and are operable to monitor inputs from sensing devices and other networked control modules, and to execute control and diagnostic routines to govern operation of devices and actuators. Such inputs may include vehicle speed and acceleration data, speed limit data, traffic light status and location data, road gradient data, stop sign location data, traffic flow data, geospatial data, road and lane-level data, vehicle dynamics data, sensor data, etc. Routines may be executed in real-time, continuously, systematically, sporadically and/or at regular intervals, for example, each 100 microseconds, 3.125, 6.25, 12.5, 25 and 100 milliseconds, etc., during vehicle use. Alternatively, routines may be executed in response to occurrence of an event during operation of the vehicle 10.

With collective reference to both FIGS. 1 and 2, a first of the thermal fluid loops may be in the nature of a coolant loop 24 for helping to regulate the operating temperatures of one or more select components within the vehicle's battery and high-voltage electrical system. The coolant loop 24 employs an electric coolant pump 26 for selectively pumping coolant 28 through a sequence of interconnected coolant conduits 32. These coolant conduits 32 are in fluid communication with and, thus, thermally coupled to a variety of vehicle 10 and coolant loop 24 components. By way of non-limiting example, the coolant loop 24 circulates coolant 28 through an integrated power electronics (IPE) module 34 that contains power switches and associated electronics circuitry for governing operation of one or more electric traction motors. In some instances, the IPE 34 may include an AC/DC power inverter module (PIM), a high voltage (HV) supply switch set, a DC-DC step-up module, a high-power distribution module (HPDM), and/or other available devices. The traction PIM regulates transmission of electrical energy to and from the traction motor(s). The step-up module may be used to ensure the motor control voltage for the traction motor(s) meets the input DC bus voltage. Comparatively, the HPDM may be embodied as an electrical junction box that distributes high-voltage power from a rechargeable energy storage system (RESS) to a predesignated assortment of high-voltage components.

Also disposed within the coolant loop 24 is an onboard charging module (OBCM) 36 for governing the transfer of electrical power to a rechargeable traction battery pack (or simply "battery") 38. In some examples, a single-phase 3.5 kW to 22 kW OBCM 36 is installed within the vehicle's HV electrical system to assist with charging the traction battery 38 from an energy source, such as a municipal power grid, a residential electric vehicle charging station (EVCS), or other suitable source. The OBCM 36 may also be operable to direct electrical energy from the traction battery pack 38 to the electrical grid, an in-vehicle accessory, or ancillary devices that interface with the motor vehicle 10.

In many instances, the traction battery pack 38 is most efficiently charged when it is preemptively heated to a predetermined target temperature (e.g., approximately 25° Celsius (C)). To achieve a target temperature, the traction battery pack 38 may be charged or loaded in a calculatedly inefficient manner for a predefined initialization period such that a portion of the electrical energy being driven into or from the traction battery pack 38 is converted into thermal energy that heats the mass of the battery 38. To reduce or eliminate the innate inefficiencies associated with this preheating technique, thermal energy may be directed to the traction battery pack 38 via coolant 28 carried by the coolant loop 24 from other heat sources within and external to the coolant loop 24. As shown, the coolant loop 24 utilizes an electrically-powered coolant heater 30 to add thermal energy to the flow of coolant 28 that may be used to bring the traction battery pack 38 up to an optimal charging temperature.

Vehicle 10 of FIG. 1 also includes an electrohydraulic braking system 37 for selectively slowing and stopping the motor vehicle 10. To supplement or replace the braking forces provided by the braking system 37, the motor vehicle 10 may employ regenerative braking techniques in which an electric motor traction motor or motors 40 in an electric drive unit (EDU) 48 is/are used as a negative torque actuator and an electric generator. When operating as an electric generator, electricity generated by the traction motor(s) 40 may be fed back into the traction battery pack 38 by the OBCM 36. Under circumstances when the electronic controller 16 and OBCM 36 determine that the battery 38 is fully charged or additional heating is otherwise desired, the electricity generated by the traction motor(s) 40 may be converted into thermal energy that may be stored in the coolant loop 24 and transferred in metered amounts to the other loops 52, 62.

To maintain optimal battery temperature, the coolant loop 24 may employ a battery bypass 42 that is operable to selectively provide coolant flow through the traction battery pack 38 or, when desired, to bypass the battery 38 under a predetermined set of conditions. For instance, the battery bypass 42 may be set in a closed position when battery pack temperature is below the optimal battery temperature such that coolant 28 flows through the traction battery pack 38 and imparts thermal energy thereto from the OBCM 36, coolant heater 30, or other system component. Conversely, the battery bypass 42 may be set in an open position when the battery temperature is at or above the optimal battery temperature. In this example, coolant flow is directed around the battery 38. The electronic controller 16 may manage the flow of coolant 28 through the battery bypass 42 by way of a first bypass valve 44 and a second bypass valve 46. The first bypass valve 44 also operates to selectively direct the flow of coolant 28 past the second thermal fluid loop 62 and the transmission oil cooler (TOC) 60 disposed within the coolant and oil loops 24, 62. The second bypass valve 46 operates to selectively direct the flow of coolant 28 around the coolant loop 24 and a chiller 50 disposed within the coolant and refrigerant loop 24, 52. Depending on the requirements of the thermal management system 12, the first and second bypass valves 44, 46 may be variable force solenoid (VFS) valves, variable bleed solenoid (VBS) valves, or mode control solenoid valves, as some general examples.

When the first bypass valve 44 is deactivated and the battery bypass 42 is closed, the drive unit 48 may receive thermal energy from the coolant 28 via a shared heat exchange device, such as the transmission oil cooler 60. First bypass valve 44 may also provide a variable amount of coolant flow through a radiator 54 and the chiller 50 while also providing a variable amount of coolant flow through the TOC 60. The first bypass valve 44 may shunt coolant 28 away from the TOC 60, thereby bypassing heat exchange with the oil loop 62, and redirect the shunted flow through the bypass 42. Likewise, the second bypass valve 46 may operate in open and closed states in accordance with the coolant flow demands of the JATM system 12. When the second bypass valve 46 is in a closed state, coolant 28 flow is provided to the chiller 50 and traction battery pack 38. In the open state, however, the second bypass valve 46 directs coolant 28 to bypass the chiller 50 and battery pack 38 such that coolant 28 flows from the second bypass valve 46 directly into the coolant conduits 32 that lead to the coolant pump 26.

A convective radiator 54 is a heat exchanger that transfers thermal energy between the coolant 28 and ambient atmosphere external to the motor vehicle 10. In so doing, the radiator 54 functions to reject thermal energy from the motor vehicle 10, e.g., using air-cooled radiator core tubes. In some examples, the radiator 54 operates in conjunction with a fan 56 and an airflow management device, such as a shutter mechanism 58, that is operated, e.g., via the electronic controller 16, to precisely regulate the temperature of the radiator 54 and the coolant 28 passing through the radiator 54. In an open position, airflow incident upon the shutter mechanism 58 is allowed to pass therethrough and towards the fan 56 and radiator 54. In a closed position, airflow incident upon the shutter mechanism 58 is prevented from passing through to the radiator 54 and fan 56.

Thermal energy may be exchanged back-and-forth between the coolant and oil loops 24, 62 via the shared TOC 60 that is thermally and fluidly disposed in both loops 24, 62. The TOC 60 of FIG. 2 may include at least two internal fluid passageways that are physically separated from one another: a first section of the TOC 60 defines a coolant passageway that carries coolant 28 through the TOC 60 as a part of the coolant loop 24; a second section of the TOC 60 defines an oil passageway that carries oil 64 through the TOC 60 as a part of the oil loop 62. Despite the fact that the TOC 60 is part of both the coolant loop 24 and the oil loop 62, there is no direct fluid interface between the coolant loop conduits 32 and the oil loop conduits 68 within the TOC 60 to ensure the coolant 28 is prevented from mixing with oil 64 circulating in the oil loop 62.

A second of the thermal fluid loops may be in the nature of an oil loop 62 for helping to regulate the operating temperatures of one or more select components within the vehicle's powertrain system. Oil loop 62 of FIG. 2, for example, employs an electric oil pump 66 for pumping a dielectric lubricating oil 64 through a chain of oil conduits 68 in fluid communication with an electric drive unit 48. The EDU 48 may be an electrically variable drive unit that contains one or more electric motor/generator units, epicyclic gear train elements, clutches, power electronics and, optionally, differential and axle components. In accord with the illustrated example, the vehicle 10 has a select all-wheel drive (AWD) powertrain layout with the EDU 48 located on a secondary or rear axle and an internal combustion engine (ICE) assembly 70 located on a primary or front axle. For a full-electric vehicle (FEV) powertrain, the ICE assembly 70 may be replaced entirely by one or more electric motors. The ICE assembly 70 and traction motor 40 operate singly and collectively to provide driving torque via a multi-speed power transmission 72 to one or more vehicle drive wheels 14 in order to propel the motor vehicle 10. The transmission 72 may be a manually shifted, automatic, multi-clutch, or continuously variable transmission, that is mechanically and/or fluidly coupled to the ICE assembly 70.

The oil loop 62 circulates oil 64 through the transmission oil cooler 60, transmission 72, and EDU 48, thereby lubricating and cooling the internal components of the transmission 72 and EDU 48. In some aspects, the transmission 72 and engine assembly 70 may share a supply of oil 64 via the oil loop 62. Circulating oil 64 may be used to warm the transmission 72 and/or engine assembly 70 during vehicle startup; conversely, oil 64 may be used to cool the engine assembly 70, transmission 72, and other select components of the vehicle powertrain as necessary during vehicle operation. The oil loop 62 may have a predetermined optimal operating temperature at which the lubricating oil 64 has desirable viscosity and lubrication characteristics (e.g., approximately 70° C.).

A third of the thermal fluid loops may be in the nature of a refrigerant loop 52 for helping to regulate the cabin temperature of the vehicle's passenger compartment 11 (FIG. 1). As noted above, the chiller 50 functions as a shared heat exchange device for transferring thermal energy back-and-forth between the coolant loop 24 and the refrigerant loop 52. Comparable to the TOC 60 of FIG. 2, the chiller 50 may include two internal fluid passageways that are physically separated from one another: a first section of the chiller 50 defines a coolant passageway that carries coolant 28 through the chiller 50 as a part of the coolant loop 24; and a second section of the chiller 50 defines a refrigerant passageway that carries refrigerant 74 through the chiller 50 as a part of the refrigerant loop 52. Despite the fact that the chiller 50 is part of both the coolant loop 24 and the refrigerant loop 52, there is no direct fluid interface between the coolant loop conduits 32 and the refrigerant loop conduits 76 within the TOC 60 to ensure the coolant 28 is prevented from mixing with the refrigerant 74.

The refrigerant loop 52 of FIG. 2 employs a string of refrigerant conduits 76 to fluidly connect multiple heat generating and heat sink devices in order to thermally regulate a passenger compartment 11 within the body of the motor vehicle 10. The passenger compartment 11 may be thermally isolated from other vehicle compartments and may receive thermal energy via one or more air vents or other thermal conduits of a heating, ventilation, and air conditioning (HVAC) system 78. Fundamentally, the refrigerant loop 52 may operate in both a heating mode and a cooling mode by delivering heated air and cooled air, respectively, to the passenger compartment 11. Stated another way, the HVAC system 78 functions as a heat pump and as an air conditioner in which both heating and cooling functions are possible.

A compressor 80 within the HVAC system 78 of the refrigerant loop 52 receives refrigerant 74 via one of the refrigerant conduits 76 known as a suction line 82. As the name implies, the compressor 80 compresses heated gaseous refrigerant 74 to thereby increase the temperature and pressure of the refrigerant 74. The now high-pressure, high-temperature refrigerant 74 then leaves the compressor 80 via another refrigerant conduit 76 known as a discharge line 84 and flows into a cabin condenser 86. This cabin condenser 86 is a heat exchange device equipped with condenser coils through which the refrigerant 74 flows; these coils may be in direct fluid communication with ambient air inside the passenger compartment 11. An HVAC blower or fan 88 blows air over the cabin condenser 86, thereby releasing thermal energy from the condenser 86 into the passenger compartment. In accord with the illustrated example, the refrigerant loop 52 also employs an exterior "front-end" condenser 90 that is in direct contact with ambient atmosphere external to the vehicle 10. When engaged, the exterior condenser 90 releases thermal energy from the refrigerant 74 to the atmosphere.

The HVAC system 78 is also equipped with a number of expansion valves 92 that, depending on HVAC system design parameters, may be mechanical thermostatic expansion valves (TXV) and/or electronic expansion valves (EXV). Condensed and pressurized refrigerant 74 received from the cabin condenser 86 and/or exterior condenser 90 may be routed through an expansion valve 92 fluidly upstream from the HVAC system 78. The refrigerant 74 cools as the refrigerant 74 is de-pressurized by the expansion valve 92. The refrigerant 74 then passes through an evaporator 94, which is a heat exchange device in which a series of refrigerator coils carries a flow of cooled refrigerant 74. These refrigerator coils exchange thermal energy with the passenger compartment atmosphere. The HVAC blower/fan 88 blows air over the cabin evaporator 94 to cool the passenger compartment of the motor vehicle 10. After having passed through the evaporator 94, the refrigerant 74 is directed back through the compressor 80. Refrigerant 74 is also selectively passed through another expansion valve 92 to the chiller 50; in so doing, thermal energy is either obtained from or released to the coolant loop 24, e.g., depending on the relative temperatures of the coolant 28 and refrigerant 74, and the thermal requirements of the JATM system 12 componentry. Additional information and options for joint active thermal management systems may be found in commonly owned U.S. Patent Appl. Pub. No. 2020/0047586 A1, to Eugene V. Gonze et al., which is incorporated herein by reference in its entirety and for all purposes.

Figure 3:
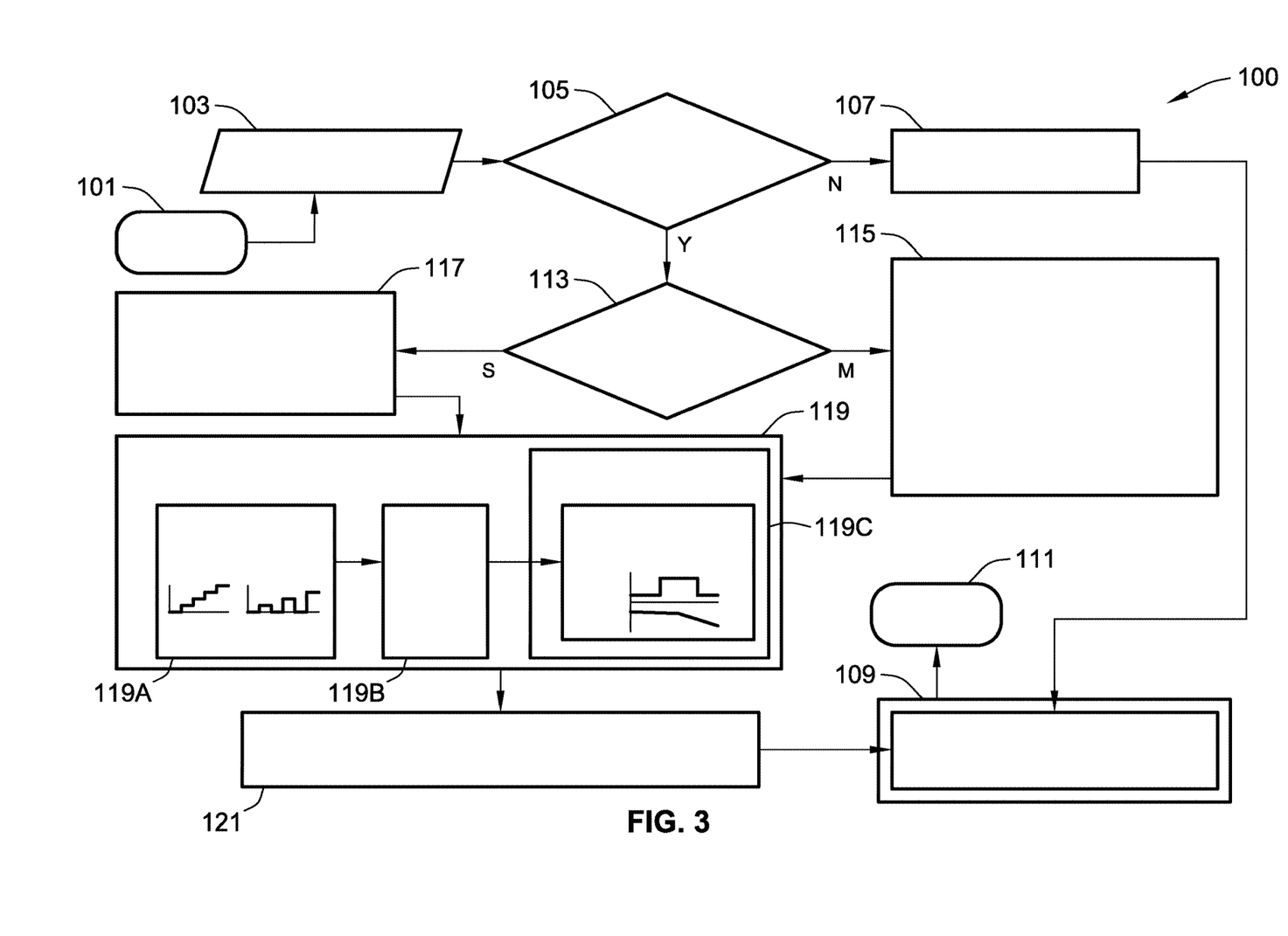
FIG. 3 is a flowchart illustrating a representative refrigerant storage control protocol for selectively stowing refrigerant in inactive heat exchange devices, which may correspond to memory-stored instructions that are executable by a resident or remote controller, control-logic circuit, programmable control unit, or other integrated circuit (IC) device or network of devices in accord with aspects of the disclosed concepts.

With reference next to the flow chart of FIG. 3, an improved method or control strategy for selective storage of surplus refrigerant in an inactive heat exchange device of a thermal management system, such as JATM system 12 of FIG. 2, of a motor vehicle, such as P4 HEV 10 of FIG. 1, is generally described at 100 in accordance with aspects of the present disclosure. Some or all of the operations illustrated in FIG. 3, and described in further detail below, may be representative of an algorithm that corresponds to processor-executable instructions that are stored, for example, in main or auxiliary or remote memory (e.g., memory device 18 of FIG. 1), and executed, for example, by an electronic controller, processing unit, logic circuit, or other module or device or network of modules/devices (e.g., electronic controller 16 of FIG. 1), to perform any or all of the above and below described functions associated with the disclosed concepts. It should be recognized that the order of execution of the illustrated operation blocks may be changed, additional operation blocks may be added, and some of the described operations may be modified, segmented, combined, or eliminated.

Method 100 of FIG. 3 begins at terminal block 101 with memory-stored, processor-executable instructions for a programmable controller or control module or similarly suitable processor to call up an initialization procedure for a JATM system control protocol. This routine may be executed in real-time, continuously, systematically, sporadically, and/or at regular intervals, for example, each 10 or 100 milliseconds during normal and ongoing operation of the motor vehicle 10. As yet another option, terminal block 101 may initialize responsive to a user command prompt, a resident vehicle controller prompt, or a broadcast prompt signal received from an "off-board" centralized vehicle services system (e.g., a host cloud computing service). Upon completion of the control operations presented in FIG. 3, the method 100 may advance to terminal block 111 and temporarily terminate or, optionally, may loop back to terminal block 101 and run in a continuous loop.

Advancing from terminal block 101, the method 100 executes input/output data block 103 to monitor for and detect the occurrence of an "overcharge situation." Overcharge detection may be performed by a resident Diagnostic Controls Module (DCM) that is programmed to assess, for example, whether or not a real-time amount of refrigerant— refrigerant volume, pressure, temperature, and/or mass— within the plumbing of the thermal management system exceeds a system-calibrated threshold amount allowed for the system's current operating mode. To perform this evaluation, the DCM may first confirm what is the current operating mode of the JATM system, which may include verifying that the HVAC system is ON and in either a "Cabin Cooling" mode or a "Cabin Heating" mode. Once the system's current operating mode is identified, the DCM may call-up an associated lookup table that is stored in resident cache memory to identify which of a list of calibrated threshold amounts is associated with the current operating mode of the JATM system.

By way of non-limiting example, if the vehicle 10 is being operated in an ambient outside temperature of 24° C. (~75° F.), and an occupant of passenger compartment 11 selects "A/C" (Cabin Cooling mode) and sets the HVAC system 78 to 15° C. (~60° F.), the refrigerant loop 52 of JATM system 12 may use 1500 g of refrigerant 74 and activate the front-end condenser 90 and evaporator 94. In this instance, the Cabin Cooling mode may have a system-calibrated "mild" threshold and "severe" threshold of maximum allowable refrigerant mass of 1550 g and 1600 g, respectively. Contrastingly, if the vehicle 10 is being operated in an ambient outside temperature of 5° C. (~40° F.), and an occupant of passenger compartment 11 selects "HEAT" (Cabin Heating mode) and sets the HVAC system 78 to 27° C. (~80° F.), the refrigerant loop 52 may use 1300 g of refrigerant 74 and activate the cabin condenser 86 and chiller 50. In this instance, the Cabin Heating mode may have a system-calibrated "mild" threshold and "severe" threshold of maximum allowable refrigerant mass of 1350 g and 1400 g, respectively. For scenarios in which the charge surplus is relatively minor (e.g., current refrigerant mass is less than 3-5% over current system refrigerant mass demand) and, thus, is neither mild nor severe, an overcharge situation is not detected.

In order to establish that the current amount of refrigerant exceeds the calibrated threshold may necessitate that one or more of the thermal system's sensor devices monitor refrigerant volume, mass, and/or pressure and output sensor signals indicative thereof. Once the measured, real-time amount of system refrigerant and the calibrated threshold amount of allowable refrigerant are known, the DCM may confirm that the latter exceeds the former and quantify the difference as a mathematical differential between the current amount and the calibrated threshold amount. In at least some applications, the DCM may also check real-time or near real-time system temperatures, valve positions, compressor speeds, etc., and compare these current values to corresponding expected values. An overcharge diagnostic may be triggered if any one or more of these properties are outside respective system-calibrated offset allowances from their expected values; this will trigger and run a Charge Optimization Storage Logic, which is described in further detail below.

Upon detecting an overcharge situation, the method 100 assesses whether or not a heat exchange device within the thermal system is not in use and has existing refrigerant storage capacity and, thus, is "available" for excess refrigerant storage, as indicated at decision block 105. As noted above, the JATM system 12 activates a select subset of the heat exchange devices in the refrigerant loop 52 to achieve a desired operating mode. In the above examples, the JATM system 12 may be operating in a Cabin Heating mode during which the cabin condenser 86 and chiller 50 are active and the front-end condenser 90 and evaporator 94 are inactive. Front-end condenser 90 may therefore be used to temporarily stow excess refrigerant for the duration of cabin heating if the condenser 90 has available storage space. Other operating modes of the JATM system 12 may bypass a different heat exchanger, enabling that heat exchanger to operate as a refrigerant storage location. In accord with the representative system architecture of FIG. 2, for example, the chiller 50, condenser 90, and evaporator 94 may all be employed as a sump volume for purposes of storing excess refrigerant.

Theoretically, a heat exchanger is able to store a volume of refrigerant that coincides with the internal fluid volume of that heat exchanger. That is, each heat exchange device has a manufacturer-defined internal volume through which refrigerant may be cycled and, when desired, selectively stored. However, the maximum storage capacity available in a given device at a given time may fluctuate depending on a number of factors including, for example, ambient temperature, device operating temperature, refrigerant temperature, front-end airflow, residual refrigerant mass already in the device, an operating setpoint of one or more heat exchange devices in a parallel fluid path, etc. When using the external condenser 90 as a refrigerant sump volume, for example, excess charge of refrigerant 74 that is deposited into the condenser 90 may need to be metered to ensure the refrigerant pressure on the exit-side of the condenser does not excess the throw pressure threshold of a passive pressure-control check valve 96 downstream from the condenser 90. If the refrigerant pressure exceeds the throw pressure threshold, the check valve 96 automatically opens and refrigerant 74 would flow through the external condenser 90 rather than stop inside the condenser 90.

If a heat exchange device is not available for excess refrigerant storage (block 105=NO), the diagnostics control module may set a flag that heat exchanger storage of surplus refrigerant is unavailable, as indicated at process block 107. In accord with the above discussion, storage may be deemed "unachievable" if: (1) none of the heat exchange devices is inactive; (2) none of the inactive heat exchange devices has available storage capacity; and/or (3) none of the inactive heat exchange devices with available storage capacity are able to retain refrigerant (e.g., due to flow-control factors). Method 100 may contemporaneously execute input/output data block 109 and transmit a status report to a resident or remote diagnostics system, e.g., with a request to re-evaluate the thermal management system and any of the attendant system-calibrated settings and parameters. The method 100 may thereafter proceed to terminal block 111 and temporarily terminate.

Upon determining that a heat exchange device is available for excess refrigerant storage (block 105=YES), method 100 advances to decision block 113 to determine what is the severity of the overcharge situation. By way of example, and not limitation, the electronic vehicle controller 16 (e.g., a DCM within the controller 16) may retrieve calibrated mild and severe threshold values for a current system operating mode from a memory-stored lookup table. As described in the examples above, a Cabin Heating mode may have a system-calibrated "mild" threshold value of 1350 g and a system-calibrated "severe" threshold of 1400 g. It should be appreciated that these values are purely representative and, thus, non-limiting in nature. If the measured, real-time or near real-time mass of refrigerant 74 in the refrigerant loop 52 is presently at 1500 g, then the overcharge severity may be deemed to be "severe." On the other hand, if the measured, real-time or near real-time mass of refrigerant 74 in the refrigerant loop 52 is 1375 g, then the overcharge severity may be deemed to be "mild."

Responsive to a determination that the overcharge situation is a mild overage, method 100 executes process block 115 to confirm that a "mild" excess refrigerant storage routine can be executed. Determining if the storage routine can be executed at block 115 includes evaluating a predefined (first) set of criteria. The aforementioned criteria set may include: (1) confirming the AC compressor 80 in the third thermal loop 52 is in proper operational control (e.g., not off and not ramping down); (2) confirming an active flow-control valve upstream from the available heat exchanger, such as an External Condenser Flow Valve (ECFV) 93 of front-end condenser 90, is closed; and/or (3) confirming the current pressure of the refrigerant 74 is equal to or greater than a threshold minimum pressure. The electronic controller 16 may determine that the AC compressor 80 is in "proper operational control" through control logic for processing closed-loop compressor feedback indicating that the compressor 80 is not in either a STOP mode or a RAMPDOWN mode. The compressor 80 may be said to be in proper operational control when operating in a PID CONTROL mode or a STARTUP mode.

Responsive to a determination that the overcharge situation is a severe overage, method 100 executes process block 117 to confirm that a "severe" excess refrigerant storage routine can be carried out. Determining if the storage routine can be executed at block 117 includes evaluating distinct, predefined (second) set of criteria. This criteria set may include confirming the active flow-control valve upstream from the available heat exchanger (e.g., ECFV 93) is not open. It should be appreciated that each of the above-described criteria sets may include greater, fewer, or different criteria without departing from the intended scope of this disclosure. Moreover, the method 100 may include more or less than two severity levels for the overcharge situation.

Upon confirming that a storage routine can be initiated at either process block 115 or block 117, method 100 commences an excess refrigerant storage routine in predefined process block 119. For process block 119A within predefined process block 119, control signals are output from the electronic controller 16 to the ECFV 93 to feed surplus refrigerant 74 into the available condenser 90 in an incremental and metered fashion. Employing a stepped-increment feed technique, for example: the ECFV 93 moves to an initial open value (e.g., about 0.25% open) and holds this initial position for a predefined amount of time (e.g., 5 ms); the ECFV 93 then increases its position by a specified value to a second open value (e.g., about 0.35% open) and holds this second position for the same or a different predefined amount of time; ECFV 93 continues to incrementally increase its position by a specified value and hold that position for a predefined time until either all excess refrigerant is stored or until the ECFV 93 reaches a controlled open value (e.g., about 0.75% open). In at least some embodiments, the electronic controller 16 closely regulates the ECFV 93 so that it is not allowed to reach its maximum open position during the storage of excess refrigerant.

As another available, yet non-limiting option, process block 119A may employ an increment-drop-increment technique: the ECFV 93 moves to an initial open value (e.g., 35% open) and holds this initial position for a predefined amount of time (e.g., 8-10 ms); the ECFV 93 then closes for a set amount of time (e.g., 3-5 ms); the ECFV 93 then increases its position to a second open value (e.g., 45% open) and holds this second position for a predefined amount of time; the ECFV 93 then closes again for a set amount of time; this process is repeated until either all excess refrigerant is stored or until the ECFV 93 reaches a controlled open value or, optionally, its full-open position. During cycling of the ECFV 93, e.g., for the stepped-increment feed technique or the increment-drop-increment technique, the vehicle controller 16 may command a specific amount of front-end air flow that blows over the external condenser 90, e.g., to reduce the fluid pressure within the condenser 90 and, thus, allowing for refrigerant 74 to move into a lower pressure region.

For process block 119B of predefined process block 119, the thermal management system monitors current refrigerant pressures—high-side and low-side—during the excess refrigerant storage routine. Each time the ECFV 93 of FIG. 2 is opened while the check valve 96 is closed, for example, refrigerant is stored in the external condenser 90; there should be a measurable drop in refrigerant pressure within the parallel segments of refrigerant loop 52. Generally speaking, the opening and closing of the ECFV 93 is carefully modulated to allow refrigerant to flow into the external condenser 90 while being sufficiently restrictive to ensure that the influx of refrigerant 74 does not enter with sufficient force to reach the back-end of the condenser 90 and push its way through the one-way check valve 96.

Method 100 continues to process block 119C to monitor high-side refrigerant pressure to note when this value is within an "acceptable" range. During the excess refrigerant storage routine, the overall refrigerant pressure within the third thermal loop 52 will reduce because refrigerant has entered the external condenser 90 and is therefore no longer part of an active path of flow. There are two pressures that may be monitored during predefined process block 119, and they each may exhibit distinct trends that may be used to define when the storage routine is complete: High Side Refrigerant Pressure (HSRP) and Low Side Refrigerant Pressure (LSRP). These two pressures may have their derivatives calculated; it is expected that HSRP reduces while LSRP remains substantially constant reduces less drastically. When both derivatives meet a predetermined threshold, the ECFV 93 will maintain its current position for a specified amount of time, and then it will close. If the pressures do not follow their expected trends, the ECFV 93 may reach a maximum open position and, at that juncture, the storage routine may end. Once refrigerant pressure has been sufficiently reduced, process block 121 sets a flag noting that excess refrigerant storage is complete and directs the JATM system 12 to return to a normal operating mode. For instance, when refrigerant pressure drops below a predefined maximum allowable pressure threshold or the ECFV reaches a maximum allowable open position, the external condenser will close and the system will resume normal operation. As yet a further option, excess refrigerant storage may be flagged as complete in response to the ECFV opening to a maximum allowed open position even if refrigerant pressure has not dropped below a maximum allowable pressure threshold.

Employing the above techniques enables an active thermal management system to operate in a wide range of ambient temperatures and driving modes, leads to hardware cost savings, and improves overall robustness of the thermal system. By dynamically controlling the quantity of refrigerant that is part of the active path of flow in the thermal system, the system is able to provide the thermal characteristics that set the foundation for occupant comfort while protecting the system from hardware damage. Disclosed techniques obviate scenarios in which there is too much refrigerant in the active path of flow and the system is "overcharged," which may cause the thermal system to overpressure and shut down in order to protect the hardware. By utilizing an available heat exchanger for excess refrigerant storage, there is a cost savings in hardware (e.g., by reducing the size of a dedicated refrigeration storage container. Additionally, the storage algorithm increases thermal system robustness by making an active thermal management system less sensitive to refrigerant levels.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state memory, a hard drive, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A joint active thermal management (JATM) system for a vehicle with a vehicle battery system, a powertrain system, and a passenger compartment, the JATM system comprising:
    a first thermal loop including a first conduit configured to fluidly connect to the vehicle battery system, a first heat exchanger fluidly connected to the first conduit, and a first pump operable to pump a coolant through the vehicle battery system and the first heat exchanger;
    a second thermal loop thermally coupled to the first thermal loop and including a second conduit configured to fluidly connect to the powertrain system, a second heat exchanger fluidly connected to the second conduit, and a second pump operable to pump an oil through the powertrain system and the second heat exchanger;
    a third thermal loop thermally coupled to the first thermal loop and including parallel third and fourth conduits configured to circulate a refrigerant and thereby heat and/or cool the passenger compartment, a third heat exchanger fluidly connected to the third conduit, and a fourth heat exchanger fluidly connected to the fourth conduit; and
    an electronic controller programmed to:
        determine if a current amount of the refrigerant in the third thermal loop exceeds a calibrated threshold amount for a current operating mode of the JATM system;
        determine, responsive to the current amount exceeding the calibrated threshold amount, if the fourth heat exchanger is available to store a refrigerant differential between the current amount and the calibrated threshold amount; and
        transmit, responsive to the fourth heat exchanger being available, a command signal to the third thermal loop to store at least a portion of the refrigerant differential in the fourth heat exchanger.

2. The JATM system of claim 1, wherein determining if the current amount of the refrigerant exceeds the calibrated threshold amount includes:
    determining the current operating mode of the JATM system; and
    retrieving, from a lookup table stored in a memory device, the calibrated threshold amount associated with the current operating mode of the JATM system.

3. The JATM system of claim 2, wherein determining if the current amount of the refrigerant exceeds the calibrated threshold amount further includes receiving, from a sensor device, sensor signals indicative of a volume, a mass, a temperature, and/or a pressure of the refrigerant in the third thermal loop.

4. The JATM system of claim 2, wherein retrieving the calibrated threshold amount from the lookup table includes retrieving a calibrated severe threshold amount and a calibrated mild threshold amount less than the calibrated severe threshold amount, and wherein determining if the current amount of the refrigerant exceeds the calibrated threshold further includes determining if the current amount of the refrigerant exceeds the calibrated mild threshold amount and/or the calibrated severe threshold amount.

5. The JATM system of claim 4, wherein determining if the fourth heat exchanger is available to store the refrigerant differential includes:
responsive to the current amount exceeding the calibrated mild threshold amount, evaluating a first set of criteria; and
responsive to the current amount exceeding the calibrated severe threshold amount, evaluating a second set of criteria distinct from the first set of criteria.

6. The JATM system of claim 5, wherein the first set of criteria includes: confirming an air conditioning compressor in the third thermal loop is operational and not ramping down;
confirming an active flow-control valve fluidly downstream from the fourth heat exchanger is closed; and confirming a pressure of the refrigerant in the third thermal loop is equal to or greater than a threshold minimum pressure, and wherein the second set of criteria includes confirming the active flow-control valve fluidly upstream from the fourth heat exchanger is closed.

7. The JATM system of claim 1, wherein the command signal is sent to an electronic flow-control valve located fluidly upstream from the fourth heat exchanger and causes the electronic flow-control valve to position in a partially open state less than a fully open state.

8. The JATM system of claim 7, wherein the command signal causes the electronic flow-control valve to fluctuate between the partially open state and a closed state.

9. The JATM system of claim 7, wherein the command signal causes the electronic flow-control valve to open in predefined increments from a closed state to the partially open state.

10. The JATM system of claim 1, further comprising transmitting, responsive to the fourth heat exchanger not being available, another command signal to the third thermal loop to store at least a portion of the refrigerant differential in a dedicated refrigerant storage container.

11. The JATM system of claim 1, wherein the second heat exchanger includes a transmission oil cooler fluidly connected to the first and second conduits thereby thermally coupling the second thermal loop to the first thermal loop.

12. The JATM system of claim 1, wherein the third thermal loop further includes a refrigerant chiller fluidly connected to the first and third conduits thereby thermally coupling the third thermal loop to the first thermal loop.

13. The JATM system of claim 1, wherein the first heat exchanger includes a coolant heater and/or a radiator, the second heat exchanger includes a transmission oil cooler, the third heat exchanger includes a refrigerant heating condenser and/or an evaporator, and the fourth heat exchanger includes a refrigerant chiller and/or a front-end refrigerant condenser.

14. An electric-drive vehicle comprising:
a vehicle body with a passenger compartment;
a plurality of road wheels attached to the vehicle body;
a powertrain system with a traction motor attached to the vehicle body and operable to drive one or more of the road wheels to thereby propel the electric-drive vehicle;
a vehicle battery system with a traction battery pack attached to the vehicle body and operable to power the traction motor;
a joint active thermal management (JATM) system, including:
a coolant loop including a coolant conduit fluidly connected to the vehicle battery system, a coolant heater and/or a radiator fluidly connected to the coolant conduit, and a coolant pump operable to pump coolant through the vehicle battery system and the coolant heater and/or radiator;
an oil loop thermally coupled to the coolant loop and including an oil conduit fluidly connected to the powertrain system, a transmission oil cooler fluidly connected to the oil conduit, and an oil pump configured to pump oil through the powertrain system and the transmission oil cooler; and
a refrigerant loop thermally coupled to the coolant loop and including parallel coolant conduits configured to circulate a refrigerant to thereby cool and heat the passenger compartment, a refrigerant heating condenser and/or an evaporator fluidly connected to one of the parallel coolant conduits, and a refrigerant chiller and/or a front-end refrigerant condenser fluidly connected to another one of the parallel coolant conduits; and
an electronic controller programmed to:
determine if a current amount of the refrigerant in the refrigerant loop exceeds a calibrated threshold amount for a current operating mode of the JATM system;
determine, responsive to the current amount exceeding the calibrated threshold, if the front-end refrigerant condenser is available to store a refrigerant differential between the current amount and the calibrated threshold amount; and
transmit, responsive to the front-end refrigerant condenser being available, a command signal to the refrigerant loop to store at least a portion of the refrigerant differential in the front-end refrigerant condenser.

\* \* \* \* \*